No. 880,255. PATENTED FEB. 25, 1908.
T. F. VANDEGRIFT & W. JOHNSTON.
SHAFT COUPLING.
APPLICATION FILED AUG. 1, 1907.
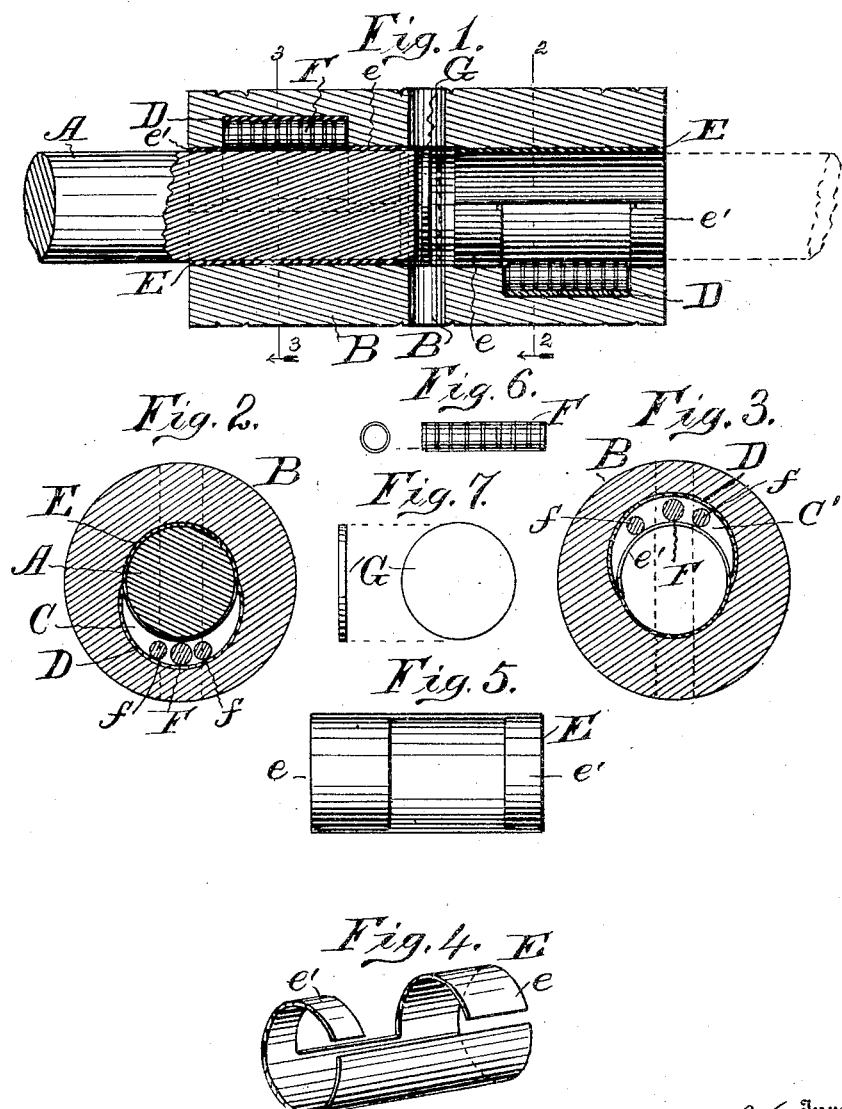

UNITED STATES PATENT OFFICE.

THEODORE F. VANDEGRIFT AND WILLIAM JOHNSTON, OF SHELBYVILLE, INDIANA.

SHAFT-COUPLING.

No. 880,255.	Specification of Letters Patent.	Patented Feb. 25, 1908.

Application filed August 1, 1907. Serial No. 386,629.

*To all whom it may concern:*

Be it known that we, THEODORE F. VANDEGRIFT and WILLIAM JOHNSTON, citizens of the United States, residing at Shelbyville, in the county of Shelby and State of Indiana, have invented certain new and useful Improvements in Shaft-Couplings, of which the following is a specification.

This invention appertains to certain new and useful improvements in shaft couplings; the object of the invention is to provide a coupling sleeve of such construction that the same is adapted to connect the adjacent ends of shafts in such a manner that the same may turn, one section independent of the other, for a short distance when the direction of rotation is changed, for the purpose of avoiding shock incident to an immediate reversal of the direction of motion, and with such and other ends in view, our invention consists in the construction and combination of the parts, as will be hereinafter set forth and specifically pointed out in the claim.

In the accompanying drawings, which illustrate an approved form of our invention, Figure 1 is a longitudinal section. Figs. 2 and 3 are cross sections on the lines 2—2 and 3—3. Fig. 4 is a detail perspective view, showing form of bushing used between the shafts and the sleeve. Fig. 5 is a side elevation of the bushing. Fig. 6 shows the larger binding rolls, and Fig. 7 shows a disk that is placed within the sleeve and between the ends of the shafts.

Referring to the drawings, A indicates the shaft and B the coupling sleeve or collar, such sleeve having a longitudinal bore that is slightly greater in diameter than the diameter of the shafts to which such sleeve is applied. The sleeve may be constructed as a part of a pulley or wheel, and when the shafts which are to be connected are of different diameters the sleeve is bored to correspond therewith. The sleeve B is provided through its transverse center with a hole or opening B' in which may be placed a bar or tool that is used to center the shafts and for turning the sleeve or one of the shafts, as may be desired. The sleeve is made up of one solid piece of metal and has on opposite sides chambers C and C' such chambers having walls that are eccentric to the axis of the sleeve or centers of the shafts, and the chambers or recesses are positioned so that the ends will be nearer the ends of the sleeve than they are to the center thereof.

The chambers or recesses C, C' may be cast or otherwise formed in the sleeve and against the curved walls are placed metal plates D, D, preferably of steel, such plates being held in place by their inherent resiliency, and against such steel plates and the exterior of the shafts clamping or friction rollers will impinge.

Before applying or inserting the shafts in the sleeve, there are placed within the bore of the sleeve soft metal bushings E, E, shown in detail by Figs. 4 and 5 of the drawings, such bushings being made from plates of copper which are cut to provide end portions $e$ and $e'$. Such bushings when applied are adapted to overlie the shafts and to leave uncovered the eccentric recesses in the sleeve, so that the clamping rollers F, $f$, may bear against the shafts and the segmental plates D, D. The rollers F are provided with circumferential corrugations or recesses, while the smaller rollers $f$ have plain surfaces, a pair of smaller rollers being used in each eccentric recess or chamber.

G, refers to a disk which is of about the same diameter as the bore in the sleeve B, such disk being placed in the sleeve prior to the insertion of one of the bushings E, and the function of the disk is to keep the ends of the shaft from coming together. This is desirable particularly when the sleeve is used to couple the ends of a shaft which has been broken, and it will be noted that the bushings E, E, are of such size that the disk may occupy a position to one side of the aperture B'.

In practice the segmental plates D, D, are placed in the eccentric recesses in the sleeve, and one of the soft metal bushings E is put in the tubular portion of the sleeve, a disk G which is of the same diameter as the bore of the sleeve is inserted from the opposite end of the sleeve. The purpose of the disk is to prevent the ends of the shafts abutting or passing beyond the center of the sleeve, and the disk will be held in place by the second bushing. When the plate D, bushing E and the disk G have been properly positioned the sleeve is turned to locate one of the eccentric recesses downward and the rollers $f$, F and $f$ are placed in the eccentric recess. The shaft is then inserted in the sleeve. After one of the sections of the shaft has been inserted in the sleeve the sleeve is turned and the other plate, bushing and rollers are put in the sleeve, and the other section of the shaft is placed in position, so that the two sections will be coupled one to the other.

Having thus set forth our invention, what we claim as new and desire to secure by Letters Patent, is:—

1. In a shaft coupling, a sleeve having a longitudinal bore the diameter thereof being greater than the diameter of the shafts upon which the sleeve is placed and eccentric recesses formed in the sleeve between its ends and on opposite sides of the bore, longitudinally divided bushings having end portions which encircle the shafts, said bushings being cut away at points opposite the eccentric recesses, and clamping rolls maintained within the spaces formed by the eccentric recesses, for the purpose set forth.

2. In a shaft coupling, a sleeve having a longitudinal bore and recesses on opposite sides of the bore and between the ends of the sleeve, bushings which encircle the shafts and are cut away at points opposite the recesses, and a plurality of clamping rolls of different diameters located in each of the eccentric recesses, substantially as shown.

3. In a shaft coupling, a sleeve having a longitudinal bore of greater diameter than the shafts to which the sleeve is to be applied, such sleeve having eccentric recesses formed therein, the recesses being located between the ends of the sleeve and on opposite sides of the bore therethrough, bushings which are cut away opposite the recesses, curved plates maintained in the recesses, clamping rolls between the plates and the shafts, and a disk between the ends of the shafts, substantially as shown and for the purpose set forth.

THEODORE F. VANDEGRIFT.
WILLIAM JOHNSTON.

Witnesses:
WILLIAM SCHORLCH,
ROBERT H. KASTER.